United States Patent [19]

Smith et al.

[11] Patent Number: 5,418,313
[45] Date of Patent: May 23, 1995

[54] PROCESS FOR REDUCING CURE TIME IN EPOXY RESINS CURED WITH METHYLENEDIANILINE AND DERIVATIVES

[75] Inventors: Andrea K. Smith, Bethlehem; Menas S. Vratsanos, Breinigsville, both of Pa.

[73] Assignee: Air Products and Chemicals, Inc., Allentown, Pa.

[21] Appl. No.: 248,779

[22] Filed: May 25, 1994

[51] Int. Cl.$^6$ .................. C08G 59/44; C08G 59/50; C08G 65/00
[52] U.S. Cl. ........................................ 528/124; 525/504
[58] Field of Search ..................... 528/124; 525/504

[56] References Cited

U.S. PATENT DOCUMENTS

| 2,981,711 | 4/1961 | Meyer et al. | 260/31.2 |
| 2,989,498 | 6/1961 | Mackenzie et al. | 528/124 |
| 3,560,413 | 2/1971 | Sundbolm | 260/47 |
| 4,656,208 | 4/1987 | Chu et al. | 534/400 |
| 5,151,486 | 9/1992 | Washio et al. | 528/124 |
| 5,280,091 | 1/1994 | Dubowik et al. | 525/504 |

FOREIGN PATENT DOCUMENTS

523522  4/1956  Canada .

OTHER PUBLICATIONS

Chemical Abstracts III:195888, "A New Method for Determining Network Properties of Curing Thermosets", Vratsanos et al.
Chemical Abstracts III:135315, "Network Mechanical Properties of Amine-Cured Epoxies", Vratsanos et al.
Chemical Abstracts III:24487, "Impulse Viscoelasticity: A New Method to Study the Polymerization of Thermosets", Farris et al.
Chemical Abstracts 107:78757, "A New Method for Determining Shrinkage Stresses", Vratsanos et al.
Vratsanos, Menas S. and Richard J. Farris, "Network Mechanical Properties of Amine-Cured Epoxies" Polymer Engineering and Science vol. 29, 806-816 (1989).
Vratsanos, Menas S. and Richard J. Farris, "A New Method for Determining Shrinkage Stresses and Properties of Curing Thermosets", Elsevier Science Publishing Co., Inc. 1986 pp. 71-80.
Vratsanos, Menas S., and Richard J. Farris, "A Method for Calculating Dynamic Mechanical Properties Using Fourier Transforms of Pulse Deformation Experiments". Journal of Applied Polymer Sciences, vol. 36, 403-413 (1988).

*Primary Examiner*—Frederick Krass
*Attorney, Agent, or Firm*—Russell L. Brewer; William F. Marsh

[57] ABSTRACT

This invention relates to an improved method for curing polyepoxide resins at elevated temperature and particularly to a method for reducing the time required to effect cure of thermosetting resins at elevated temperature without sacrificing performance. In the basic process, an epoxide resin comprising a polyglycidyl ether of a polyhydric phenol is contacted with methylenedianiline or derivative thereof, e.g., methylenedianiline and di(3-methyl-4-aminophenyl)methane in an amount sufficient to effect cure of the polyepoxide resin at an initial temperature and then raised to a final cure temperature. The improvement for reducing the time necessary for cure comprises:

effecting an initial and partial cure of the epoxy resin at a temperature between 90° and 130°;
increasing the temperature of the epoxy resin at a point when the ratio of the slope of the equilibrium modulus to the initial slope of equilibrium modulus in megapascals plotted as a function of time in minutes for the curing epoxy resin as determined by the equation:

$$Eeq = \frac{\int_0^\infty \sigma(t)dt}{\int_0^\infty \epsilon(t)dt}$$

is greater than about 20:1 to a final cure temperature between about 185° and 230° C. and then
maintaining a final cure temperature until the slope of said equilibrium modulus falls below about 0.1:1 preferably below about 0.05:1.

12 Claims, 1 Drawing Sheet

PROCESS FOR REDUCING CURE TIME IN EPOXY RESINS CURED WITH METHYLENEDIANILINE AND DERIVATIVES

TECHNICAL FIELD

This invention relates to a process for reducing the cure time of polyepoxide resins cured with methylenedianiline and derivatives thereof.

BACKGROUND OF THE INVENTION

Epoxy resins by their very nature are generally chemically resistant and have utility as coatings, encapsulating agents and composite matrices. Even so, the properties of epoxy resins also are effected by the type of curing agent used for curing the polyepoxide. Aliphatic and aromatic polyamines have been used in the past for curing epoxy resins. Cycloaliphatic amine curatives although permitting rapid, subambient and low temperature cures are often used for elevated cure cycles. Aromatic amines require elevated temperature cure but offer excellent chemical and temperature resistance. It is important in elevated temperature cure that the conditions are controlled to effect substantially complete cure while achieving commercially acceptable performance properties within as short as time as possible.

Representative patents which describe epoxy resins and the utilization of cycloaliphatic amines as curatives are as follows:

U.S. Pat. No. 3,560,443 discloses a process for preparing moldings from polyepoxides and polyamines. Examples of polyamines suited for effecting cure of the polyepoxide resin include 4,4'-methylenebis(2-alkyl-6-methylanilines).

U.S. Pat. No. 2,981,711 discloses the cure of epoxy resins with aromatic amines of the formula $X_1HN-A-R-B-NHX_2$. Examples include p,p'-diaminophenyl; p,p'-diaminodiphenylproprane and a partially hydrogenated derivatives.

U.S. Pat. No. 5,280,091 discloses the cure of epoxy resins using a mixture methylene bridged poly(cyclohexyl-aromatic)amines. Cure is effected at 80° C. for 2 hours followed by reaction at 150° C. for 3 hours.

U.S. Pat. No. 4,656,208 discloses the production of thermosetting polyepoxide resins which are cured with an amine hardener. Aromatic amine hardeners include diaminodiphenylsulfone, methylenedianiline, and diaminodiphenylether.

SUMMARY OF THE INVENTION

This invention relates to an improved process for curing polyepoxide resins at elevated temperature and particularly to a process for reducing the time required to effect cure of thermosetting resins at elevated temperature without sacrificing performance. In a basic process for elevated temperature cure of an epoxide resin comprising a polyglycidyl ether of a polyhydric phenol is mixed with methylenedianiline or derivative thereof in an amount sufficient to effect cure of the polyepoxide resin. The polyepoxide is partially cured at an initial temperature with the temperature being raised and final cure being effected at a final cure temperature for a time sufficient to obtain desired properties. The improvement for reducing the time necessary for elevated temperature cure comprises:

effecting an initial and partial cure of the epoxy resin at a temperature between 90° and 130° C.;

increasing the temperature of the epoxy resin at a point when the ratio of the slope of the equilibrium modulus to the initial slope of equilibrium modulus in megapascals plotted as a function of time in minutes for the curing epoxy resin as determined by the equation:

$$Eeq = \frac{\int_o^\infty \sigma(t)dt}{\int_o^\infty \epsilon(t)dt}$$

wherein Eeq is equilibrium modulus, $\sigma(t)$ i stress response, $\epsilon(t)$ is strain history, (t) is time and dt is time increment is greater than about 20:1 to a final cure temperature between about 185° and 230° C.; and, then maintaining a final cure temperature until the slope of said equilibrium modulus falls below about 0.1. preferably below about 0.05:1.

Alternatively, one may begin increasing temperature at a point where the (absolute) slope is from about 0.3 to 0.5. Typically, polyepoxide resins can be cured by this process in about 1.5 to 2 hours depending on the temperatures selected in contrast to conventional cure schedules of about 3 to 5 hours. A typical cure schedule of about 20 to 40 minutes at initial temperatures of 90°-130° C., generally 95°-120° C., more specifically, 100-120 degree celcius, followed by cure for 1 to 2 hours at 185°-230° C., typically, 195° to 210° C. The temperature during increase to the final cure temperature may be raised within 10 minutes of the point where the ration of the slope of the eqilibrium modulus is greater than 20:1.

There are several advantages associated with the process of this invention, namely that of utilizing impulse viscoelasticity in designing an elevated temperature cure schedule for a polyepoxide resin utilizing mehtylenedianiline as the curative. These advantages include:

an ability to enhance volume throughput of epoxy products due to the reduced time needed to cure the epoxy resin;

an ability to minimize and reduce resin loss due to rapid viscosity build during cure;

an ability to obtain excellent cures and thereby minimize amine exudation resulting from an incomplete cure;

an ability to generate epoxy compositions having excellent thermal properties, chemical resistance, and mechanical properties including fracture toughness, flexibility, elongation, strength and so forth required for composites and structural applications.

DRAWINGS

FIG. 1 is a curve of equilibrium modulus and temperature as functions of time for an epoxy resin (Epon 826 epoxy resin) cured with a methylendianiline curative at 120° C. for 0.5 hours and 2 hours at 200° C.

DETAILED DESCRIPTION OF THE INVENTION

Figure 1:
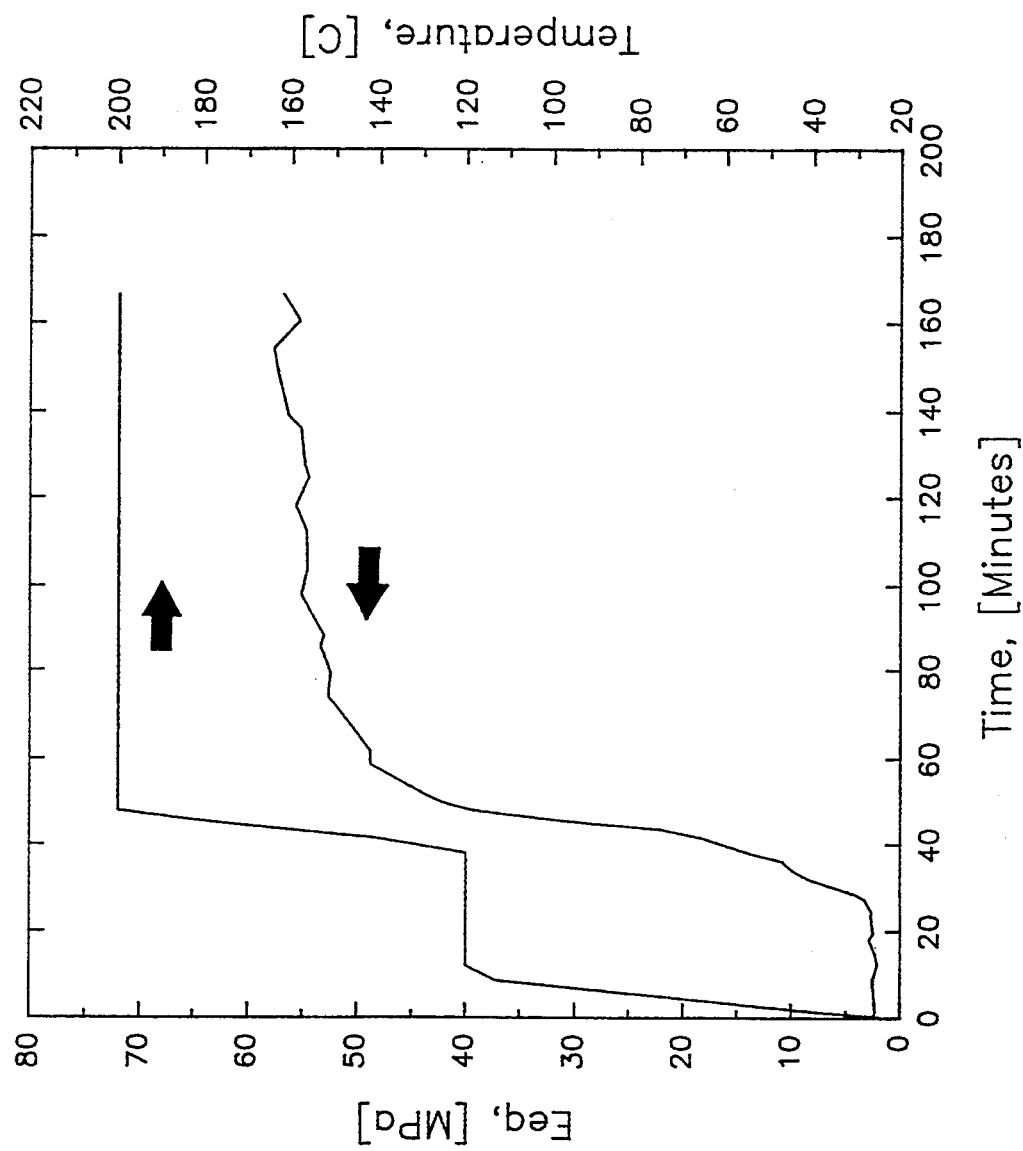

Polyepoxides which can be cured using the process of this invention include those liquid polyepoxides having more than one epoxy group per molecule with the epoxy group typically being a terminal 1,2-epoxy group. The polyepoxides are well known and representative polyepoxides are described in U.S. Pat. Nos. 3,351,610, 4,447,586 and 4,946,925 which are incorporated by reference. Examples of polyepoxides which are conventionally used include those which are based upon phenols and aliphatic polyols. Representative phenolic polyepoxides typically used include glycidyl polyethers of polyhydric phenols derived from a polyhydric phenol and epihalohydrin. The resulting polyepoxides generally will have an epoxide equivalent weight ranging up to about 200. Epihalohydrins used in preparing the polyepoxides include epichlorohydrin and epibromohydrin and polyhydric phenols include resorcinol, hydroquinone, di(4-dihydroxyphenyl)methane, commonly referred to as bisphenol F; and, di(4-hydroxyphenyl)propane, commonly referred to as bisphenol A and novolacs where the phenolic groups are bridged via methylene groups. Of these polyhydric phenols, those based upon bisphenol A are the most common and preferred in the practice of this invention.

The polyepoxides can be cured in conventional manner by effecting reaction with e.g., methylene bridged dianiline and derivatives, e.g., $C_{1-6}$ alkyl derivatives. Examples of methylene bridged phenyl amines include di(4-aminophenyl)methane (PACM); di(3-methyl-4-aminophenyl)methane; di(3,5-methyl-4-aminophenyl)methane. Trimethylenetetraaniline and analogs thereof are included as derivatives of methylenedianiline.

Typically the amount of amine curative which is reacted with the polyepoxide will range from a level of 0.6 to 1.7 times the stoichiometric or equivalent amount of polyepoxide resin present. Generally, the level of cycloaliphatic amine to polyepoxide is from about 0.9 to 1.1 times the stoichiometric amount, stoichiometric being one equivalent weight of epoxide per equivalent weight of amine hydrogen.

It has been found that the analytical technique of impulse viscoelasticity can be utilized to develop a reduced cure schedule for epoxy resins. Basically, the analytical technique of impulse viscoelasticity provides an indication as to point where there is "dead time" in a cure cycle and by determining the point where there is "dead time" in the cure cycle, one can take appropriate and prompt action, namely, increasing temperature at a desired rate and eliminate the dead time experienced in the practice of conventional cure cycles. The application of impulse viscoelasticity not only assists in reducing the cure schedule by highlighting the "dead time" in the cure cycle, it also can eliminate exotherm spikes in the cure cycle which result in poorer physical properties for the resulting cured epoxy resin. Often, in an elevated temperature cure where there is an exotherm spike during cure, glassiness, excessive brittleness and other forms of degradation may result within the resulting cured epoxy resin.

Impulse viscoelasticity is a relatively recent analytical technique which measure equilibrium modulus, viscosity and other properties as functions of time. Equilibrium modulus is expressed by the formula:

$$Eeq = \frac{\int_o^\infty \sigma(t)dt}{\int_o^\infty \epsilon(t)dt}$$

In conventional terms, equilibrium modulus is the ratio of the stress response of the sample to an applied strain; stress is the internal resistance of the epoxy resin to the external deformation applied thereto, while strain refers to the deformation applied to the epoxy resin. Further information regarding the technique of impulse viscoelasticity is described in the articles, "Network Mechanical Properties of Amine-Cured Epoxies," by Menas S. Vratsanos and Richard J. Farris, *Polymer Engineering and Science*, Vol. 29, 806–816 (1989); "A New Method for Determining Shrinkage Stresses and Properties of Curing Thermosets," by Menas S. Vratsanos and Richard J. Farris, publ. by Elsevier Science Publishing Co., Inc., 1986 pages 71–80; and "A Method for Calculating Dynamic Mechanical Properties Using Fourier Transforms of Pulse Deformation Experiments," by Menas S. Vratsanos and Richard J. Farris, *Journal of Applied Polymer Science*, Vol. 36, 403–413 (1988), which articles are incorporated by reference.

To facilitate an understanding of the application of impulse viscoelasticity for the development of a cure cycle for an epoxy resin using methylenedianiline or derivative reference is made to the FIGURE. This FIGURE shows the development of equilibrium modulus and temperature as functions of time in minutes for a methylenedianiline cured epoxy resin mixture. The equilibrium modulus in megapascals is plotted on the ordinate with time in minutes on the abscissa. An initial cure was effected at 120° C. At point A, about 30 minutes into the cure, the slope of the equilibrium modulus curve would begin to increase dramatically. But, in contrast to conventional cure schedules the temperature was increased from 120° to 200° C. at a rate of 10° C. per minute. With a gradual increase in temperature, e.g., 3°–20° C., preferably 5° to 10° C. per minute, cure accelerates through this region. At final cure temperature, the slope of equilibrium modulus becomes flatter; cure is deemed complete when the slope falls below 0.1:1. The time allotted for cure after the final cure temperature has been reached is more a function of the properties desired in the final product. However, properties remain excellent. Although not shown by the equilibrium modulus curve, it is believed a reason for enhanced properties is that a retarding network e.g., epoxy vitrification in the dead space leading to crosslink and network cure retardation, was not established because of the appropriate temperature response.

The keys to reducing the cure schedule without sacrificing ultimate physical properties lies in the appropriate timing of the temperature increase, the rate of temperature increase, the final cure temperature, the final cure temperature and the duration of cure at the final cure temperature. It has been found that the temperature should be increased from an initial cure temperature of about 90°–130° C. at a point generally immediately prior to the point where the ratio of the slope of the equilibrium modulus curve to that slope immediately prior is greater than 20:1, preferably above 100:1. For example, at point A of FIG. 1, the slope of the modulus prior to point A is about 0.013:1. After point A, the slope is greater than 10:1. By increasing temperature at a rate typically from 5°–10° C. per minute within a time period of about 5–10 minutes on either side of point A, not only can one eliminate the dead time associated in conventional cure cycles one can also achieve a better and more rapid cure due to reduced polymer vitrification due to improperly low cure temperatures.

As a last point, the temperature is finally increased to a level of 185° to 230° C., preferably 195°–215° C., which is about 10°–30° C., preferably 15°–20° C., above the ultimate Tg. By curing the epoxy resin at such unconventionally high temperatures, one drives the cure substantially to completion and reduces the glassy character of the curing resin. As the slope of the equilibrium modulus-time data drops, generally below about 0.1:1, preferably below about 0.05:1 to lower, cure is deemed complete.

Conventional accelerators, plasticizer, fillers, glass and carbon fibers, pigments, solvents, etc. used in formulating epoxy coatings, mold compositions, lacquers, etc. can be used. Selection and amount of these additives is at the option of the formulator. Representative diluents, e.g., monoepoxides and accelerators may be used.

The following example is intended to illustrate various embodiments of the invention and are not intended to restrict the scope thereof.

EXAMPLE 1

Impulse Viscoelasticity Development In A Reduced Cure Schedule For An Epoxy Resin Impulse viscoelastic data were generated as a function of time using a reduced cure cycle of 30 minutes at 120° C. followed by 2 hours at 200° C. Samples were prepared by filling a sample assembly with the degassed amine-epoxy mixture and loading the assembly into the environmental chamber of a rheometer. Small deformations were applied to the sample throughout cure. The stress and strain data from each deformation were collected and used to calculate the impulse viscoelastic data. The Eeq results are shown in FIG. 1. Data were taken approximately every 1–3 minutes and the development of cure measured by impulse viscoelasticity. The duration of the deformation was approximately 10 seconds. (If samples are taken on a less frequent basis, and the duration of the deformation extended significantly, aberrations in the slope of the equilibrium modulus time data may result and one may not be able to selectively identify an appropriate ratio of the slopes near point A). The slopes of the Eeq-time data should be measured on a 5–10 minute time scale so as to avoid any erroneous slope calculations associated with noise fluctuations in the Eeq data.

FIG. 1 shows a slope before point A was about 0.013 and after point A about 1.0. After 1 hour at final cure, the slope was about 0.016.

What is claimed is:

1. In a process for curing an epoxy resin by reacting a polyglycidal ether of a polyhydric phenol with a methylenedianiline or a $C_{1-6}$ alkyl-substituted derivative thereof as an amine curative wherein the ratio of polyglycidyl ether of a polyhydric phenol to polyamine curative is from 0.6–1.7 amine hydrogens per epoxide equivalent of polyglycidyl polyether of a polyhydric phenol, said cure being effected at an initial cure temperature and then gradually increased to a final elevated cure temperature, the improvement for reducing the cure time without significant reduction in ultimate physical properties which comprises:

effecting an initial and partial cure of the epoxy resin at a temperature between 90° and 130° C.;

increasing the temperature of the epoxy resin at a point when the ratio of the slope of the equilibrium modulus to the initial slope of equilibrium modulus in megapascals plotted as a function of time in minutes for the curing epoxy resin as determined by the equation:

$$Eeq = \frac{\int_0^\infty \sigma(t)dt}{\int_0^\infty \epsilon(t)dt}$$

wherein Eeq is the equilibrium modulus, $\sigma(t)$ is stress response, (t) is time, dt is time increment, and $\epsilon(t)$ is strain response is greater than about 20:1 to a final cure temperature between about 185° and 230° C.; and, then maintaining a final cure temperature until the slope of said equilibrium modulus falls below about 0.1:1.

2. The process of claim 1 wherein the polyglycidyl ether of a polyhydric phenol is a glycidyl ether of bisphenol A.

3. The process of claim 2 wherein the temperature is raised within 10 minutes of the point where the ratio of the slope of the equilibrium modulus is greater than 20:1.

4. The process of claim 3 wherein the final cure temperature is from about 195° to 210° C.

5. The process of claim 4 wherein the amine curative is di(4-aminophenyl)methane.

6. The process of claim 5 wherein the initial cure temperature is from about 100°–120° C.

7. The process of claim 3 wherein the ratio of amine curative to polyglycidyl ether of a polyhydric phenol is 0.9–1.1 amine hydrogens per epoxide equivalent of polyglycidyl polyether of a polyhydric phenol.

8. In a process for curing an epoxy resin by reacting a polyglycidyl ether of a polyhydric phenol with methylenedianiline or a $C_{1-6}$ alkyl derivative thereof as a curative wherein the ratio of polyglycidyl ether of a polyhydric phenol to polyamine curative is from 0.6–1.7 amine hydrogens per epoxide equivalent of polyglycidyl ether of a polyhydric phenol, said cure being effected at an initial cure temperature and then increased to a final elevated cure temperature, the improvement for reducing the cure time without significant reduction in ultimate physical properties which comprises:

utilizing a methylenedianiline curative selected from the group consisting of di(4-aminophenyl)methane and di(3-methyl-4-aminophenyl)methane;

effecting an initial cure at a temperature of from 90°–130° C. for a time of about 20–40 minutes;

gradually increasing the temperature during cure to a final temperature of from 195°–210° C., said temperature being increased at a rate of from 3°–20° C. per minute; and, maintaining a final cure temperature of from 195°–210° C. for about 1 to 2.5 hours.

9. The process of claim 8 wherein the polyglycidyl ether of a polyhydric phenol is a glycidyl ether of bisphenol A.

10. The process of claim 9 wherein the ratio of amine curative to polyglycidyl ether of a polyhydric phenol is 0.9–1.1 amine hydrogens per epoxide equivalent of polyglycidyl polyether of a polyhydric phenol.

11. The process of claim 10 wherein the temperature from initial cure to final cure temperature is increased when the absolute slope of the equilibrium modulus is between 0.3 and 0.5:1.

12. The process of claim 11 wherein the amine curative is di(4-aminophenyl)methane.

* * * * *